(12) United States Patent
Kanjo

(10) Patent No.: US 6,230,856 B1
(45) Date of Patent: May 15, 2001

(54) ROD LOCKING MECHANISM FOR COMPRESSION SLACK ADJUSTER

(75) Inventor: Wajih Kanjo, Lockport, IL (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/389,669

(22) Filed: Sep. 2, 1999

(51) Int. Cl.⁷ ..................................... F16D 65/38
(52) U.S. Cl. .................. 188/196 P; 188/300; 188/202; 188/196 R; 188/197; 188/265
(58) Field of Search .................. 188/67, 300, 196 C, 188/196 P, 79.57, 79.51, 196 R, 197, 265, 202, 199; 267/64.72

(56) References Cited

U.S. PATENT DOCUMENTS

| | | | |
|---|---|---|---|
| 3,850,269 | * 11/1974 | Beacon | 188/202 |
| 3,900,086 | * 8/1975 | Billeter | 188/202 |
| 4,405,037 | * 9/1983 | Severinsson et al. | 188/196 D |
| 4,593,797 | * 6/1986 | Schmitt | 188/196 D |
| 4,646,882 | * 3/1987 | Holloway et al. | 188/202 |

* cited by examiner

Primary Examiner—Robert J. Oberleitner
Assistant Examiner—Mariano Sy
(74) Attorney, Agent, or Firm—James Ray & Associates

(57) ABSTRACT

A locking assembly for preventing accidental let out of a slack adjuster is provided wherein the slack adjuster includes an elongated hollow housing member and an elongated rod member mounted for reciprocal movement within the hollow housing member. At least a portion of the rod member extends outwardly from a first end of the slack adjuster and is movable in a lateral direction with respect to a longitudinal centerline of the hollow housing member. A rod weldment washer is secured to the rod member at a predetermined location intermediate each end thereof. This rod weldment washer is positioned within the hollow housing member such that a side edge thereof is a predetermined distance from an inner surface of a sidewall of the hollow housing member during normal operation of the slack adjuster. A force applying mechanism is disposed at the first end of the slack adjuster for applying a force to the rod member in a lateral direction with respect to the longitudinal centerline of the rod member thereby causing the rod member and the rod weldment washer to move in a lateral direction with respect to the longitudinal centerline of the hollow housing member to frictionally engage the side edge of the rod weldment washer with the inner surface of the hollow housing member. This frictional engagement prevents longitudinal movement of the rod member within the hollow housing member and consequently prevents the accidental let out of the slack adjuster.

15 Claims, 1 Drawing Sheet

ROD LOCKING MECHANISM FOR COMPRESSION SLACK ADJUSTER

FIELD OF THE INVENTION

The present invention relates, in general, to slack adjuster assemblies which automatically adjust the slack in the brake rigging of a railway vehicle and, more particularly, the invention relates to a locking assembly for preventing accidental let out of the slack adjuster during shipping and handling. The present invention is particularly applicable to compression slack adjusters.

BACKGROUND OF THE INVENTION

Slack adjusters are well known components which are provided in the brake rigging of railway vehicles to automatically adjust the slack in such brake rigging for a number of reasons. One such reason is that the slack adjuster automatically maintains the brake cylinder piston rod travel within a preselected travel distance. Maintaining such brake cylinder piston rod travel distance within the prescribed limit is of particular importance in present day higher speed train operations. Another important reason is that the slack adjusters will provide a substantially more uniform braking force to be applied to each set of wheels on each car making up a train. Because of the improvement in providing a more uniform braking force, the undesirable possibility of some cars in the train being held back while other cars roll ahead is generally minimized. A third reason is that in a truck-mounted braking system, a slack adjuster may be used to replace one of the brake cylinders of the brake rigging resulting in considerable cost reduction and weight savings.

When properly installed in the brake rigging, a slack adjuster will maintain specified piston travel at all times. The unit will automatically lengthen on one of the release and application of a brake to adjust for brake shoe wear. When worn shoes are replaced, the unit can be shortened to provide proper piston travel on the forward stroke of the first brake application.

A slack adjuster must be carefully packaged to avoid accidental let out of the slack adjuster and turning of the jaw member during shipping and handling. Either of these occurrences could lead to difficulty during installation of the slack adjuster in the brake rigging.

OBJECTS OF THE INVENTION

An object of the present invention is to provide a means for preventing accidental let out of a slack adjuster during shipping and handling.

Another object of the present invention is to provide a means for preventing the turning of the jaw member of a slack adjuster during shipping and handling.

A further object of the present invention is to provide a means for maintaining a slack adjuster at a proper length and for ensuring the proper position of the jaw member during installation of the slack adjuster into the brake rigging of a railway vehicle.

Still yet a further object of the present invention is to provide a locking assembly for preventing the accidental let out and/or the turning of a jaw member of a slack adjuster during shipping, handling, and/or installation.

Another object of the present invention is to provide a locking assembly which may be quickly and easily disengaged upon installation of the slack adjuster in the brake rigging of the railway vehicle.

Although a number of objects and advantages of the present invention have been described in some detail above various additional objects and advantages of the locking assembly of the present invention will become more readily apparent to those persons who are skilled in the art from the following more detailed description of the invention, particularly when such detailed description of the invention is taken in conjunction with both the attached drawing figures and with the appended claims.

SUMMARY OF THE INVENTION

Briefly, and in accordance with the foregoing objects, the instant invention comprises a locking assembly for preventing accidental let out of a slack adjuster wherein the slack adjuster includes an elongated hollow housing member having at least one sidewall and an elongated rod member mounted for reciprocal movement within the elongated hollow housing member. At least a portion of the rod member extends outwardly from a first end of the slack adjuster and is movable in a lateral direction with respect to a longitudinal centerline of the hollow housing member. A rod weldment washer is secured to the rod member at a predetermined location intermediate each end thereof. This rod weldment washer is positioned within the hollow housing member such that a side edge thereof is a predetermined distance from an inner surface of the at least one sidewall of the hollow housing member during normal operation of the slack adjuster. A force applying means is disposed at the first end of the slack adjuster for applying a force to the rod member in a lateral direction with respect to the longitudinal centerline of the rod member thereby causing the rod member and the rod weldment washer to move in a lateral direction with respect to the longitudinal centerline of the hollow housing member to frictionally engage the side edge of the rod weldment washer with the inner surface of the hollow housing member. The frictional engagement of the rod weldment washer with the inner surface of the hollow housing member prevents longitudinal movement of the rod member within the hollow housing member and consequently prevents the accidental let out of the slack adjuster.

DETAILED DESCRIPTION OF THE INVENTION

Figure 1:
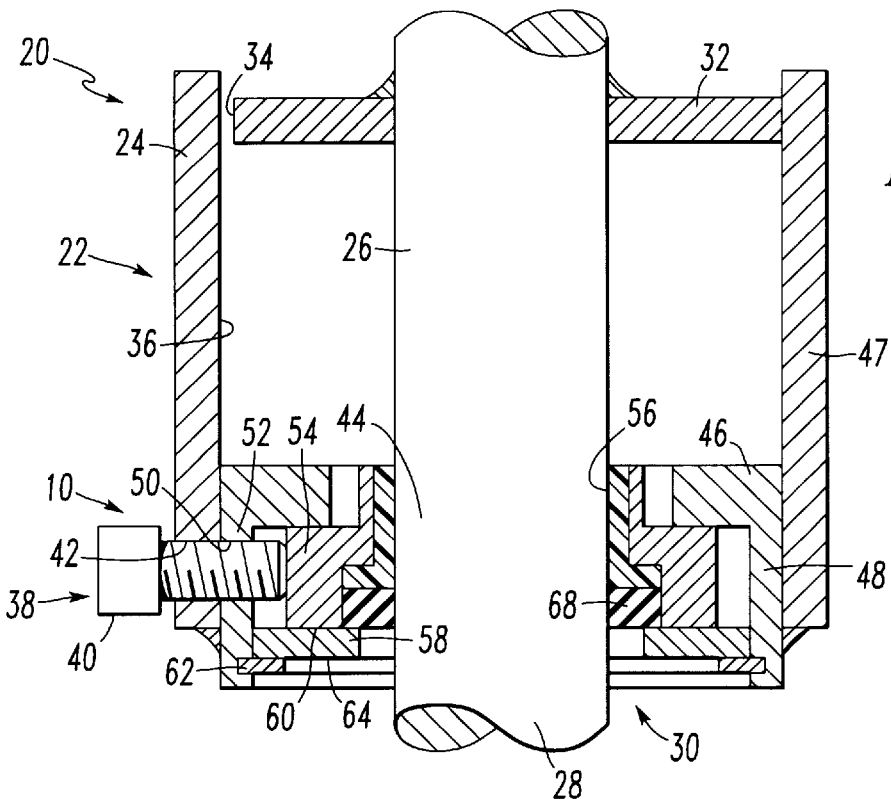
FIG. 1 is an exploded view of a portion of a compression slack adjuster including the locking assembly according to a first embodiment of the invention.

Prior to proceeding with the more detailed description of the invention, it should be noted that for the sake of clarity, identical components which have identical functions have been identified with identical reference numerals throughout the several views illustrated in the attached drawing FIGS.

Referring now to FIG. 1, there is shown a locking assembly, generally designated 10, for a compression slack adjuster, generally designated 20. The slack adjuster 20 includes an elongated hollow housing member 22 having at least one sidewall 24 and an elongated rod member 26 mounted for reciprocal movement within the elongated hollow housing member. At least a portion 28 of the rod member 26 extends outwardly from a first end 30 of the slack adjuster 20 and is movable in a lateral direction with respect to a longitudinal centerline of the hollow housing member 22.

A rod weldment washer 32 is secured to the rod member 26 at a predetermined location intermediate each end of the rod member 26. The rod weldment washer 32 is positioned with the hollow housing member 22 such that a side edge 34 of the washer 32 is a predetermined distance from an inner surface 36 of the at least one sidewall 24 of the hollow housing member 22 during normal operation of the slack adjuster 20.

A force applying means 38 is disposed at the first end 30 of the slack adjuster 20 for applying a force to the rod member 26 in a lateral direction with respect to the longitudinal centerline of the rod member 26 thereby causing the rod member 26 and the rod weldment washer 32 to move in a lateral direction with respect to the longitudinal centerline of the hollow housing member 22 to frictionally engage the side edge 34 of the rod weldment washer 32 with the inner surface of the hollow housing member 22. This frictional engagement of the rod weldment washer 32 with the inner surface of the hollow housing member 22 prevents longitudinal movement of the rod member 26 within the hollow housing member 22 and consequently prevents the accidental let out of the slack adjuster 20.

At least one aperture 42 is formed through the at least one sidewall 24 of the hollow housing member 22 substantially in alignment with at least a portion 44 of the rod member 26 adjacent the first end 30 of the slack adjuster 20. An end cap 46 is secured to a first end 47 of the hollow housing member 22. At least a portion 48 of the end cap 46 extends within the hollow housing 22 in abutment with the inner surface of the at least one sidewall 24 of the hollow housing member 22. The portion 48 of the end cap 46 extending within the hollow housing member 22 includes an aperture formed through a sidewall 52 of the end cap 46 substantially in alignment with the at least one aperture 42 formed through the at least one sidewall 24 of the hollow housing member 22.

A seal housing 54 is positioned within the at least a portion 48 of the end cap 46 extending with the hollow housing member 22. This seal housing 54 includes an aperture 56 extending throughout its length thereof such that at least a portion of the rod member 26 extends through this aperture 56 and outwardly from the first end 30 of the slack adjuster 20.

The force applying means 38 is disposed at the first end 30 of the slack adjuster 20 and includes a means 40 threadedly engageable within the at least one aperture 42 formed through the at least one sidewall 24 of the hollow housing member 22 and the aperture 50 formed through the sidewall 52 of the end cap 46 for applying a force to the rod member 26. Means 40 which is threadedly engageable with apertures 42 and 50 may be a cap screw or any well known means capable of being inserted within these apertures and applying a force to the rod member 26. Means 40 is capable of being removed at the time of installation of the slack adjuster.

This means 40 which is engageable within the at least one aperture 42 formed through the at least one sidewall 24 of the hollow housing member 22 and the aperture 50 formed through the sidewall 52 of the end cap 46 contacts the seal housing 54 and applies a force to the seal housing 54 in a lateral direction with respect to a longitudinal centerline of the hollow housing member 22 causing the seal housing 54 to move in a lateral direction and consequently causing the rod member 26 and the rod weldment washer 32 to move in a lateral direction with respect to the longitudinal centerline of the hollow housing member.

The locking assembly 10 further includes a washer 58 which is positioned within the hollow housing member 22 and below a bottom surface 60 of the seal housing 54 for retaining the seal housing 54 in position within the hollow housing member 22 and the end cap 46. A retainer member 62 is positioned below a bottom surface 64 of the washer 58 for retaining the seal housing 54 and washer 58 together within the hollow housing member 22 and the end cap 46.

Figure 2:
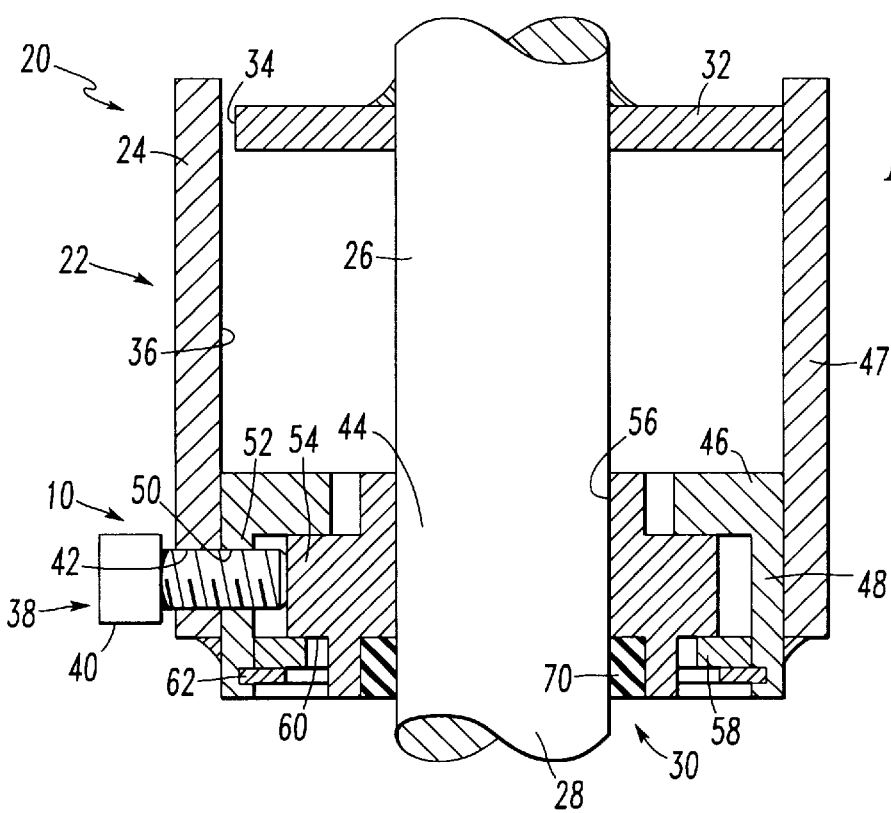
FIG. 2 is an exploded view of a portion of a compression slack adjuster including the locking assembly according to a second embodiment of the invention.

In the FIG. 1 embodiment, a spacer 68 is positioned between and in contact with at least a portion of the seal housing 54 and at least a portion of the rod member 26. Spacer 68 is also in contact with the washer 58. In the FIG. 2 embodiment, spacer 70 is also positioned between and in contact with at least a portion of the seal housing 54 and at least a portion of the rod member 26, but differs from the FIG. 1 embodiment in that spacer 70 does not contact washer 58.

Thus, the present invention has been described in such full, clear, concise and exact terms as to enable any person skilled in the art to which it pertains to make and use the same. It will be understood that variations, modifications, equivalents, and substitutions for components of the specifically described embodiments of the invention may be made by those skilled in the art without departing from the spirit and scope of the invention as set forth in the appended claims.

I claim:

1. A locking assembly for preventing accidental let out of a slack adjuster, such slack adjuster including an elongated hollow housing member having at least one sidewall and an elongated rod member mounted for reciprocal movement within such elongated hollow housing member, at least a portion of such rod member extending outwardly from a first end of such slack adjuster and being movable in a lateral direction with respect to a longitudinal centerline of such hollow housing member, said locking assembly comprising:

(a) a rod weldment washer secured to said rod member at a predetermined location intermediate each end thereof, said rod weldment washer positioned within such hollow housing member such that a side edge thereof is a predetermined distance from an inner surface of such at least one sidewall of such hollow housing member during normal operation of such slack adjuster, and (b) a force applying means disposed at such first end of such slack adjuster for applying a force to such rod member in a lateral direction with respect to such longitudinal centerline of such rod member thereby causing such rod member and said rod weldment washer to move in a lateral direction with respect to such longitudinal centerline of such hollow housing member to frictionally engage said side edge of said rod weldment washer with such inner surface of such hollow housing member, said frictional engagement of said rod weldment washer with such inner surface of such hollow housing member preventing longitudinal movement of such rod member within such hollow housing member and consequently preventing such accidental let out of such slack adjuster.

2. A locking assembly for preventing accidental let out of a slack adjuster as recited in claim 1 including at least one aperture formed through such at least one sidewall of such hollow housing member substantially in alignment with at least a portion of such rod member adjacent such first end of such slack adjuster.

3. A locking assembly for preventing accidental let out of a slack adjuster as recited in claim 2 including an end cap secured to a first end of such hollow housing member, at least a portion of said end cap extending within such hollow housing member in abutment with such inner surface of such at least one sidewall of such hollow housing member.

4. A locking assembly for preventing accidental let out of a slack adjuster as recited in claim 3 wherein said portion of said end cap extending within such hollow housing member includes an aperture formed through a sidewall thereof substantially in alignment with said at least one aperture formed through such at least one sidewall of such hollow housing member.

5. A locking assembly for preventing accidental let out of a slack adjuster as recited in claim 3 including a seal housing positioned within said at least a portion of said end cap extending within such hollow housing member, said seal housing including an aperture extending throughout the length thereof and at least a portion of such rod member extending through said aperture in said seal housing and outwardly from such first end of such slack adjuster.

6. A locking assembly for preventing accidental let out of a slack adjuster as recited in claim 5 wherein said force applying means disposed at such first end of such slack adjuster includes a means threadedly engageable within said at least one aperture formed through such at least one sidewall of such hollow housing member and said aperture formed through a sidewall of said end cap for applying said force to said rod member.

7. A locking assembly for preventing the accidental let out of a slack adjuster as recited in claim 6 wherein said means engageable within said at least one aperture formed through such hollow housing member and said aperture formed through said sidewall of said end cap contacts said seal housing and applies a force to said seal housing in a lateral direction with respect to a longitudinal centerline of such hollow housing member causing said seal housing to move in a lateral direction and consequently causing such rod member and said rod weldment washer to move in a lateral direction with respect to such longitudinal centerline of such hollow housing member.

8. A locking assembly for preventing accidental let out of a slack adjuster as recited in claim 1 wherein said locking assembly includes an aperture formed in such at least one sidewall of such hollow housing member and said force applying means is a cap screw threadedly engageable within said aperture.

9. A locking assembly for preventing accidental let out of a slack adjuster as recited in claim 7 wherein said means engageable within said at least one aperture formed through such hollow housing member and said aperture formed through said sidewall of said end cap is a cap screw.

10. A locking assembly for preventing accidental let out of a slack adjuster as recited in claim 5 including a washer positioned within such hollow housing member and below a bottom surface of said seal housing for retaining said seal housing in position within such hollow housing member and said end cap.

11. A locking assembly for preventing accidental let out of a slack adjuster as recited in claim 10 including a retainer member positioned below a bottom surface of said washer for retaining said seal housing and washer together within such hollow housing member and said end cap.

12. A locking assembly for preventing accidental let out of a slack adjuster as recited in claim 1 wherein said force applying means is capable of being removed at the time of installation of such slack adjuster.

13. A locking assembly for preventing accidental let out of a slack adjuster as recited in claim 10 including a spacer positioned between and in contact with at least a portion of said seal housing and at least a portion of said rod member.

14. A locking assembly for preventing accidental let out of a slack adjuster as recited in claim 13 wherein said spacer is in contact with said washer.

15. A locking assembly for preventing accidental let out of a slack adjuster as recited in claim 13 wherein said spacer is at a location remote from said washer.

* * * * *